Sept. 15, 1931.　　　P. R. VANICA　　　1,822,983
WHEEL ALIGNER
Filed March 27, 1928
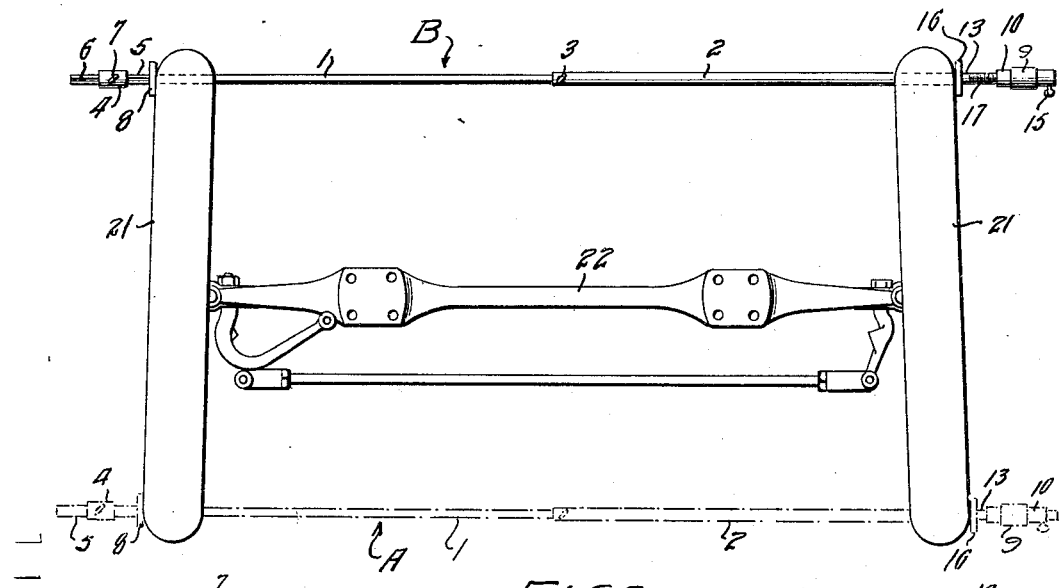
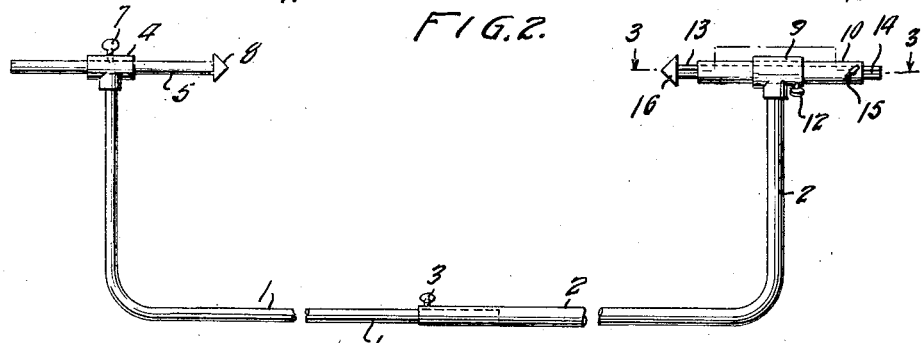
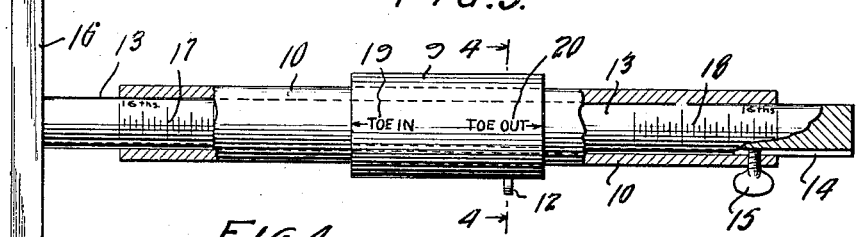
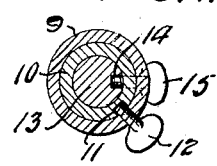
Inventor
P. R. VANICA
By Lester L. Sargent
Attorney Patented Sept. 15, 1931

1,822,983

UNITED STATES PATENT OFFICE

PEARL R. VANICA, OF AKRON, OHIO

WHEEL ALIGNER

Application filed March 27, 1928. Serial No. 265,036.

The object of my invention is to provide a novel wheel aliner of relatively simple construction adapted to show accurately whether the wheels of an automobile are in proper alinement and to provide at each end of such a device gages for determining the extent to which the wheels are out of alinement.

I attain these and other objects of my invention by the device illustrated in the accompanying drawings, in which—

Figure 1 is a plan of the front truck of an automobile with the device applied to the wheels, showing the manner of use;

Fig. 2 is a detail elevation of the invention;

Fig. 3 is an enlarged view of the device, taken on line 3—3 of Fig. 2 and partly in section; and Fig. 4 is a section on line 4—4 of Fig. 3.

Like numerals designate like parts in each of the several views.

Referring to the accompanying drawings I provide an L-shaped rod 1 and an L-shaped tube 2, telescopically mounted on each other and adapted to be held in adjusted position by a suitable set screw 3. Mounted on the end of rod 1 is a T-tube or sleeve 4, while mounted on the end of tube 2 is a similar T-tube or sleeve 9. Slidably mounted in the T-tube 4 is a short slidably mounted gage rod 5 carrying the straight edge 8 disposed at right angles to the rod 5. This device may be secured in adjusted position by the set screw 7. Mounted in the T-tube 9 is a short tube 10 having a longitudinal groove 11 to receive the end of set screw 12. Slidably mounted in the tube 10 is a slidably mounted rod 13 which is provided with a longitudinal groove 14. Rod 13 carries a straight edge 16, similar to the straight edge 8. A set screw 12 in T-tube 9 holds tube 10 in adjusted position while the set screw 15 secures rod 13 in adjusted position in the tube 10. The device is provided with the measurement markings 17 and 18, the end carrying measurement markings 17 being the toe-in end, as indicated by the numeral 19, and the end carrying the measurement markings 18 being the toe-out end as indicated by the numeral 20.

In Figure 1 is illustrated the front wheels 21 of an automobile and the axle 22 on which they are mounted. Also in Figure 1 the letter B shows the aliner applied to the forward portion of the wheels while the letter A indicates the device, in dotted lines, applied to the rear portion of the wheels.

As shown in Fig. 1 the straight edges 8 and 16 are brought into contact with the outer surface of the wheels, thus exposing the measurement markings and thereby indicating the extent to which the wheels are out of alinement in the event that they are not in true alinement. The customary method of using the device is to set the calibrated gage so that no graduations show. The aliner is then set up so that the two straight edges come in contact with the outer side walls of the rear parts of the front tires of the vehicle. To bring the straight edges to adjusted contact with the tires it will be necessary to make some adjustment of the movable tube 10 which contains the gage 13. The steel tube is then fastened in place by the thumb screw 12. The aliner is then moved forward so as to bring the straight edges in the same relative positions as before, except that they are now in contact with the outer side walls of the front parts of the tires. To bring the straight edges exactly into contact with the tires the gage 13 is moved in or out as is required. The T-tube 9 through which the slidable tube 10 passes is marked "toe-in" on one side, as indicated by the numeral 19, and "toe-out" on the other side, as indicated by the numeral 20. If the reading on the gage 13 is on the toe-in side of the steel tube the tires are toed in and are toed in the number of sixteenths of an inch indicated by the gage 13. If the measurement appears on the toe-out side of the tube 10, the tires are toed out. This gage therefore makes it impossible to read a toe-in measurement as a toe-out measurement or to confuse the reading in a reverse manner. The novel principle involved is the showing of the toe-in reading on one side or end of the gage and the toe-out reading on the opposite side or end, with a fixed point or part of the aliner disposed between the two reading locations. It is also believed novel to provide as a part of a wheel aliner a gage consisting of a movable rod or tube within another movable tube.

I also provide novel straight edges to contact with the side edges of the tires or with the wheels or any part of them.

I contemplate having the aliner used to measure outside both wheels as shown in Fig. 1, or inside one wheel and outside the other. This will be accomplished by reversing the short slidably mounted gauge rod 5 in the T-tube 4 and by further telescoping the two L-shaped bars 1 and 2.

What I claim is—

1. In a wheel aliner, the combination of an L-shaped rod and an L-shaped tube telescopically mounted on each other, T-tubes mounted on the free ends of each of said members, a gage rod slidably mounted in one of the T-tubes, said gage rod carrying a straight edge disposed at right angles to the rod, a tube slidably mounted in the other of said T-tubes, and disposed in alinement with said gage rod, a second gage rod slidably mounted in said tube and a straight edge mounted on the end of said second gage rod, the second gage rod having spaced measurement markings near opposite ends thereof, the measurement markings near one end of the rod being intended to designate the extent to which the tire toes out, and the measurement markings near the other end of the gage rod being intended to indicate the extent to which the tire toes in.

2. In a wheel aliner, the combination of an L-shaped rod and an L-shaped tube telescopically mounted on each other, T-tubes mounted on the free ends of each of said members, a gage rod slidably mounted in one of the T-tubes, said gage rod carrying a straight edge disposed at right angles to the rod, a tube slidably mounted in the other of said T-tubes and disposed in alinement with said gage rod, a second gage rod slidably mounted in said tube, and a straight edge mounted on the end of said second gage rod, the second gage rod having spaced measurement markings near opposite ends thereof, the measurement markings near one end of the rod being intended to designate the extent to which the tire toes out and the measurement markings near the other end of the gage rod being intended to indicate the extent to which the tire toes in, the second gage rod having a longitudinal groove therein, and a set screw carried in the tube and seating in said groove.

3. In a wheel aliner, the combination of an L-shaped rod and an L-shaped tube telescopically mounted on each other, T-tubes mounted on the ends of each of said members, a gage rod slidably mounted in one of the T-tubes, said gage rod carrying a straight edge disposed at right angles to the rod, a tube slidably mounted in the other of said T-tubes, a second gage rod slidably mounted in said tube, and a straight edge mounted on the end of said second gage rod, the second gage rod having spaced measurement markings near opposite ends thereof, the measurement markings near one end of the rod being intended to designate the extent to which the tire toes out and the measurement markings near the other end of the gage rod being intended to indicate the extent to which the tire toes in, the second gage rod having a longitudinal groove therein, the tube in which said second gage rod is mounted carrying a set screw fitting in said groove, the aforesaid tube also having a longitudinal groove, and a second set screw mounted in the T-tube member and adjustably engaging in the groove in the slidable tube to secure the slidable tube in adjusted position, whereby the tube may be reversed for either outside or inside measurements for vehicles of different widths.

PEARL R. VANICA.